(12) United States Patent
Tang et al.

(10) Patent No.: US 9,504,235 B2
(45) Date of Patent: Nov. 29, 2016

(54) AQUARIUM LIGHTING SYSTEM

(71) Applicant: Solvic Limited, Hong Kong (CN)

(72) Inventors: Kit Yan Eric Tang, Hong Kong (CN); Tin Yau Cheung, Hong Kong (CN)

(73) Assignee: JEKK Limited, Hong Kong (CN)

( * ) Notice: Subject to any disclaimer, the term of this patent is extended or adjusted under 35 U.S.C. 154(b) by 22 days.

(21) Appl. No.: 14/080,586

(22) Filed: Nov. 14, 2013

(65) Prior Publication Data

US 2014/0209035 A1    Jul. 31, 2014
US 2015/0156995 A9    Jun. 11, 2015

(30) Foreign Application Priority Data

Nov. 14, 2012 (GB) .................................. 1220483.0

(51) Int. Cl.
*A01K 63/06* (2006.01)
*A01K 1/03* (2006.01)
*H05B 37/02* (2006.01)

(52) U.S. Cl.
CPC ................. *A01K 63/06* (2013.01); *A01K 1/03* (2013.01); *H05B 37/02* (2013.01)

(58) Field of Classification Search
CPC .... A01K 63/06; A01K 63/00; A01K 63/003; A01K 63/02; A01K 1/03; A01K 1/031; H05B 37/02; F21S 48/1742; F21V 21/30; F21V 14/02
USPC ....... 119/245, 246, 247, 266, 267, 416, 417; 362/253, 1, 2, 285, 287, 286
See application file for complete search history.

(56) References Cited

U.S. PATENT DOCUMENTS

| 4,441,145 A | 4/1984 | Antkowiak | |
| 5,167,445 A * | 12/1992 | Linnenkamp | A01K 63/06 119/267 |
| 5,471,952 A * | 12/1995 | Tsuchiya | A01K 63/06 119/266 |

(Continued)

FOREIGN PATENT DOCUMENTS

GB    1220483.0    2/2013

OTHER PUBLICATIONS

"LightRail 3.5 IntelliDrive 6rpm Kit"—http://web.archive.org/web/2011 08052350 13/http://www.lightrail3 .comlproducts/3-5lightrail-3-5-intellidrive-6rpm-kit/; Aug. 2011 via Archive.org.

(Continued)

*Primary Examiner* — Trinh Nguyen
(74) *Attorney, Agent, or Firm* — Price Heneveld LLP

(57) ABSTRACT

A control system for an aquarium lighting system in which motor drivers alter over time the relative inclination of a light source with respect to an ornamental feature (18) within the aquarium. The effect is that light intensity (92, 94) falling incident on an ornamental feature more accurately simulates natural light impinging on a natural environment from day and seasonal movements of the sun. In addition to the relative change in inclination, power settings for the light source can be adjusted to further mimic the effects experienced with daily variations of climate and/or weather. The system effectively changes the angle of incidence of light and outwardly facing areas of ornamental features or areas beneath overhangs receive programmable levels of illumination that would otherwise not be possible with an overhead, single fixed-position light source.

12 Claims, 4 Drawing Sheets

(56) References Cited

U.S. PATENT DOCUMENTS

| | | | |
|---|---|---|---|
| 2005/0063194 A1 | 3/2005 | Lys et al. | |
| 2006/0176689 A1 | 8/2006 | Dowdy et al. | |
| 2009/0199779 A1* | 8/2009 | Parks | A01K 63/06 119/247 |
| 2011/0253056 A1* | 10/2011 | Fredricks | A01K 63/06 119/247 |
| 2012/0037081 A1* | 2/2012 | Wang | A01K 63/06 119/267 |
| 2012/0068615 A1 | 3/2012 | Duong et al. | |
| 2014/0216351 A1* | 8/2014 | Blake | A01K 63/06 119/253 |
| 2014/0261216 A1* | 9/2014 | Fosburg | A01K 63/06 119/267 |

OTHER PUBLICATIONS

"Aquarium plasma light on motorised bracket"—http://www.youtube.com/watch?v=-IRd008eL70; Nov. 30, 2010.

A Calfo, "The Static on Static Lighting: Suggestions for Better Lighting Applications of Photosynthetic Reef Organisms—Moving Light Systems MLS)" Available from http://www.wetwebmedia.com?staticlgtg.htm; Sep. 2003.

\* cited by examiner

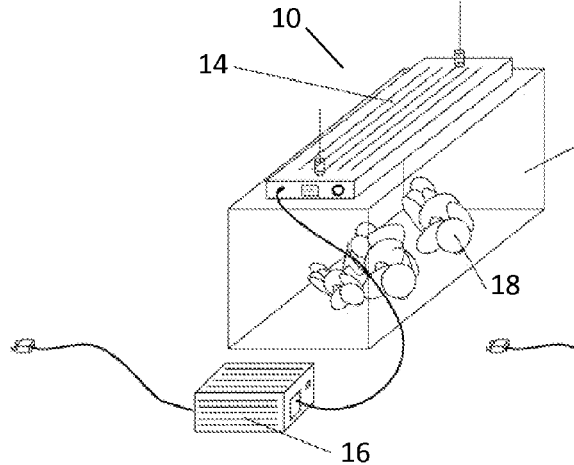
Fig 1: prior art
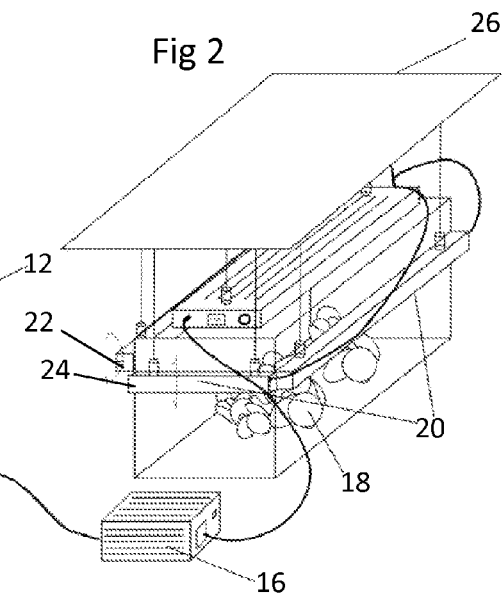
Fig 2
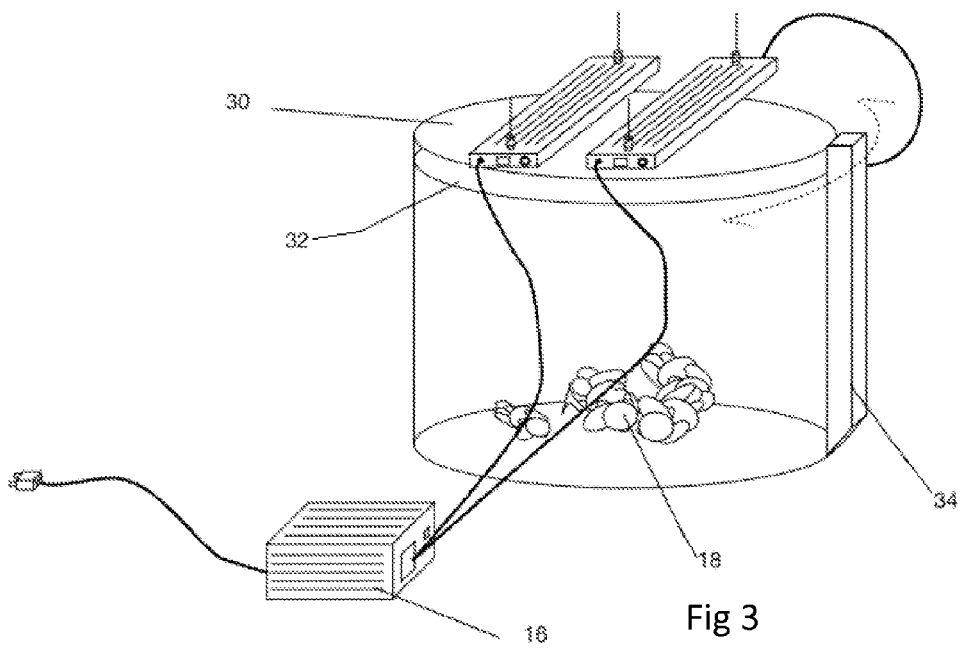
Fig 3

AQUARIUM LIGHTING SYSTEM

CROSS REFERENCE TO RELATED APPLICATION

This application claims priority to United Kingdom Application No. 12204830 filed on Nov. 14, 2012. This foreign priority United Kingdom application is hereby incorporated by reference in its entirety.

FIELD OF INVENTION

This invention relates to a lighting system for an aquarium, vivarium or other tank adapted to contain living organisms. Such a tank is generically referred to in this specification as an "aquarium" for brevity.

BACKGROUND OF INVENTION

Fluorescent strip lighting has long been the stable lighting effect in an aquarium, with the strip lighting often in the form of multiple tubes that are fixed lengthways in the lid of the aquarium.

More recently, intelligent LED-based lights, such as the L1000 BiOrb® Intelligent Light (LED), have allowed sunrise, daylight, sunset and moonlight cycles to be automatically repeated over a 24-hour period. In the BiOrb® system, LEDs are fixed in place in a planar/flat array of a circuit board in the lid of the aquarium, with white and blue light providing directly downwardly incident illumination towards the bottom of the aquarium. The LEDs, as will be understood, provide a high intensity dispersed light source either as a cool narrow bandwidth blue effect or a wider spectral white, with daylight brought about by a microprocessor-controlled increase in the amount and mix of white LED output power relative to blue LED light. In essence, the BiOrb® system regulates illumination through controlling light power intensity from a fixed overhead position.

In some existing aquarium lighting fixtures that provide a "dawn to dusk" mode, the lighting sources simply turn on and off in a sequential mode. For example, the right side of the aquarium is set as the "east" and the left side of the aquarium is set as the "west". With this type of "dawn to dusk" mode, the lights turn on from right to left and turn off from left to right to mimic the effect of the sun rise and sun set.

An artificial daylight cycle is believed to be beneficial in reducing stress levels in, for example, aquarium fish and moreover provides a better overall visual effect.

With a conventional lighting system where the light source is permanent and is directly downwardly from above the aquarium, the only way that light can be directed to locations other than places which are directly under the light source is by use of a reflector or diffusing lens. The light intensity of the rays deflected from reflector or diffusing lenses are, unfortunately, only a fraction of the full strength than the light intensity from the rays that comes directly from the light source. The amount of light that a creature/organism receives if the creature/organism is under an "overhang" is invariably insufficient to sustain the life of that creature/organism.

However, since light penetration is made a function of power, the current systems (in full day light conditions) can generate excessive light levels towards the top of the aquarium (especially in an attempt to provide requisite light to crevices) and insufficient light levels at the bottom of the tank as a consequence of dispersion and attenuating effects arising from the column of the water. In fact, the limited (time dependent) microprocessor control exercised in the more recent aquarium lighting systems is actually inadequate and really only provides aesthetic consideration for the human viewer, rather than natural environmental conditions for the animals or fish within the aquarium. Moreover, unnecessarily high levels of light can promote unwanted algae growth that, at best, is unsightly and detracts from viewing opportunities. In fact, in the context of a fish tank, too much light or insufficient light can adversely affect aquatic life.

Some specific aquarium lighting fixtures permit the user to adjust the direction of the beam by adjusting the "ball joint" of the fixture that connects to the mounting system of the fixture, but not in the context of LED-based BiOrb® systems.

Relatively sophisticated aquarium lighting systems are provided by companies such as Radion (see http://ecotechmarine.com/products/radion/) and GHL (see http://www.ghl-store.com/alu-leuchtbalken/led-haengeleuchte-mitras/mitras-1x-6100/mitras-1x-6100_-silber_-hv-_schuko-2-2-2.html). Other LED aquarium systems are provided by Maxspect and described at the website http://www.maxspect.com/.

In any event and in all cases, once set up, the light source is fixed relative to the tank and its contents.

The web article "LightRail 3.5 IntelliDrive 6 rpm Kit" [http://web.archive.org/web/20110806235013/http: www.lightrail3.com/products/3-5lightrail-3-5-intellidrive-6rpm-kit/ from Gualala Robotics Inc., dated August 2011, describes a linear lamp mover assembly for use in growing plants. At the end of travel at the end of the rail, an adjustable time delay allows the linear lamp movement to be paused.

The web article "The Static On Static Lighting: Suggestions for Better Lighting Applications of Photosynthetic Reef Organisms—Moving Light Systems (MLS)" by Anthony Calfo, available in September 2003 [http://www.wetwebmedia.com/staaticlgtg.htm], describes the linear overhead-mounted motorised tracks that permit a light source to move along the course set by the track. A Youtube video "Aquarium plasma lighting on motorised bracket" [http://www.youtube.com/watch?v=IRdO08eL70 uploaded on 30 Nov. 2010] shows an overhead-mounted linear light rail above an aquarium.

Linear moving light systems maintain a constant light angle during linear travel and move the entire light fixture, including the light fixture housing. Generally constant overhead movement of the light source along a linear rail provides insufficient dwell time for sufficient light energy to be received by stationary animals to meet the energy demands of those stationary animals required to sustain health and promote growth. Prior art systems are therefore optically pleasing and serve to provide a visual affect for the human viewer.

BRIEF SUMMARY OF THE INVENTION

According to a first aspect of the present invention there is provided an aquarium lighting system that includes: a frame; at least one light source within a housing mounted on the frame, the light source projecting, in use, a controllable light pattern; an electrical drive unit coupled to the at least one light source, the electrical drive unit configured to moderate projection of the controllable light pattern by at least controlling a change in orientation of the at least one light source in its housing through selective variation of at least one of pan and tilt and preferably both pan and tilt; and a programmable controller coupled to at least one electrical drive unit, the programmable controller configured to regulate operation of the aquarium lighting system by controlling the at least one electrical drive unit to alter and change over time the controllable light pattern projected by the at least one light source.

In an aspect the system includes a plurality of individually controllable light sources each coupled to the frame, each of the plurality of individually controllable light source coupled to an associated electrical drive unit operationally responsive to the programmable controller, the programmable controller configured to orchestrate individual movement of the plurality of individually controllable light sources to alter over time a composite projected light pattern produced by superposition of individual controllable light patterns projected from each of the plurality of individually controllable light sources.

Memory that is addressable by the programmable controller may store at least one user-defined sequence of light patterns achieved through managed movement control of the at least one electrical drive unit.

In some embodiments, the system can include at least one of: a horizontal light bar containing at least one light source (and typically a plurality of individually adjustable light sources), where the light bar is further moveable, under motor control, relative to the frame, and movement of the light bar is regulated by the programmable controller; and a vertical light stack containing at least one light source (and typically a plurality of individually adjustable light sources), where the light stack is further moveable, under motor control, relative to the frame and wherein movement of the light stack is regulated by the programmable controller.

In another aspect of the invention there is provided an aquarium system including a tank in combination with the aquarium lighting system of the first aspect, where the frame is either attached to or suspended above the tank.

The aquarium system may include a light field camera providing image data to the programmable controller, where the programmable controller is further configured to process the image data to determine incident light levels at selected points within the tank.

The aquarium system may further include at least one sensor within the tank, the sensor coupled to the programmable controller and configured to monitor light levels falling incident on the sensor and to communicate the light levels to the programmable controller, where the programmable controller is configured to regulate operation of the aquarium lighting system by controlling the at least one electrical drive unit to alter and change the controllable light pattern in response to the monitored light levels.

The various embodiments of the present invention therefore provide a programmable/automatic movable aquarium lighting fixture or otherwise an angularly adaptable aquarium lighting feature that advantageously alters, over time, the incidence angle of simulated sunlight (or moonlight) and/or the intensity of that sunlight/moonlight falling incident on features throughout the aquarium. Consequently, the dawn/dusk effects are more natural and realistic, whilst crevices in displays are at least partially illuminated for limited periods during the lamps' on-cycle (as naturally occurs with refraction and a changing angle of incidence of natural sunlight).

In other words, the embodiments of the present invention improve the light exposure for aquatic life and furthermore (and generally) reduce inadvertent or permanent blind-spots experienced in traditional aquarium lighting fixture.

The adjustability of the lens system of a preferred embodiment furthermore reduces light pollution by producing a narrower beam that either allows tighter focus onto a particular feature in the aquarium or which adjustable beam area is tailored to the size of the aquarium.

Beneficially, by controlling and varying the incident angle from the light source and effectively controlling (and reducing) the light power density on a particular area over time, the system reduces the likelihood of promoting "biofilm", i.e. algae growth, on the aquarium glass/Perspex. Reducing opportunities for algae colonization improves the overall appearance in the aquarium.

Employing the lighting system of the preferred embodiment furthermore reduces overall power consumption and improves overall brightness in the aquarium. More particularly, with ability to change beam angle and, indeed, automatically change the location of the light source, the aquarium as a whole benefits from improved light penetration and avoids localized areas of high light energy density. Therefore, lower power can be employed by the lighting system to achieve an improved, if not (if preferred) a substantially homogenous light density that ensures provides illumination at a determined or preferred level across regions of the aquarium (and its landscape), including the bottom regions of the aquarium. Indeed, the use of multiple adjustable light sources means that the aquarium lighting system of the preferred embodiments can, if desired, target and consolidate and overlay several spotlights onto one particular spot. This ability to target and direct light sources means that special care and attention can be paid to particular regions of the aquarium that demand particular levels of light. In fact, the aquarium lighting system furthermore reduces the chance to burn or bleaching aquatic life (which is a real problem with live corals) given that the continuously changing light intensity allows for natural heat regulation. As a practical example, if the aquatic life is too close to the top and near the source of light, the system operates to reduce light levels in that area. The net effect is that the system beneficially improves the tank environment to the extent that, in the context of a marine fish tank, coral and plant growth can be controlled by spectrally controllable artificial lighting that influence shape and rate of growth.

This present invention allows a user to pre-set illumination spots or areas and then to subject these points to time-varying light intensities by controlling time-varying angles for incident light and optionally power settings from those light sources. The system therefore more realistically replicates natural light environments within a modeled artificial environment by permitting the user to create effective dawn-to-dusk, moon-cycle and other climatic weather events and selectively to pre-program how an overall light environment is to evolve a given time period. The system therefore also beneficially eliminates blind-spots that arise from obstacles inside the aquarium that would otherwise be cast in continuous shadow from a conventional fixed overhead light source.

In contrast with the prior art, individual light source orientation control (relative to the light source's housing/fixture and exercised through motorized pan and/or tilt control) provides for changing light angles throughout the aquarium environment to allow a light source to provide reasonable light intensity throughout the tank. This movement, provided by time-selective pan and tilt control, is extremely important for sustaining reef animals, such as photosynthetic species.

Embodiments further permit the color temperature of the light, to be altered based on user-selectability of particular output powers or light source colors; this mimics the effects of the real sun. This effect contrasts with conventional aquarium lighting fixtures that only dim the light source to a set brightness and then switch off completely.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown. Drawings are not necessary to scale. Certain features of the invention may be exaggerated in scale or shown in schematic form in the interest of clarity and conciseness.

FIG. 1 is a representation of a typical aquarium;

FIG. 2 is a representation of a rectangular aquarium incorporating a lighting system of an aspect of the present invention;

FIG. 3 is a representation of a cylindrical aquarium incorporating a lighting system of another aspect of the present invention;

DETAILED DESCRIPTION

Figure 4:
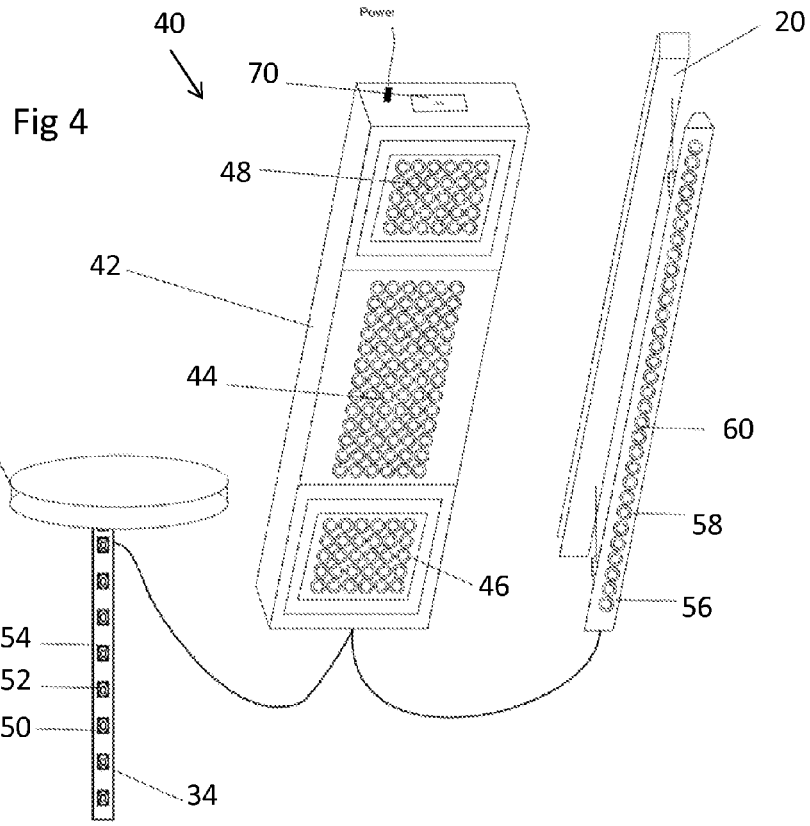
FIG. 4 is a representation of an adjustable aquarium lighting system adaptable for use in FIG. 2 or 3.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

In this specification and the appended claims, the singular forms "a," "an" and "the" include plural reference unless the context clearly dictates otherwise.

FIG. 1 is a representation of a typical aquarium 10 having any rectangular body 12 made from glass or Perspex. A lid 14 includes a fixed light source that is coupled to and powered by a power supply 16 (ultimately coupled to a mains supply). Within the rectangular body 12, a number of ornamental features 18, such as randomly distributed rocks and boulders, are illuminated by the light source.

In FIG. 2, the basic configurations of the aquarium of FIG. 1 is augmented through the provision of one or more horizontal light bars 20 that can controllably be raised or lowered as they engage against one or more sides of the rectangular body 12. The positioning of the horizontal light bars 20 is subject to automatic control by one or more motors 22, with the light bar optionally including additional servos 24 that permit an array of LEDs to be tilted relative to a horizontal plane extending laterally outwardly from a face of the horizontal light bar in abutment against the sides of the rectangular body 12. In this way, the horizontal lights bar 20 can illuminate a multiplicity of nominal layers within the aquarium by using a potentially narrow beam of light from the light source in a vertical scanning process, whilst the servos can optionally tilt the angle of illumination relative to the horizontal. A pulley system or direct drive can be located between the horizontal light bar and an artificial ceiling 26 or lid suspended above or on the lid 14 of the aquarium.

The ornamental features 18 can thus be illuminated by incident light rays having time-varying angles of incidence controlled by a microcontroller.

Figure 6:
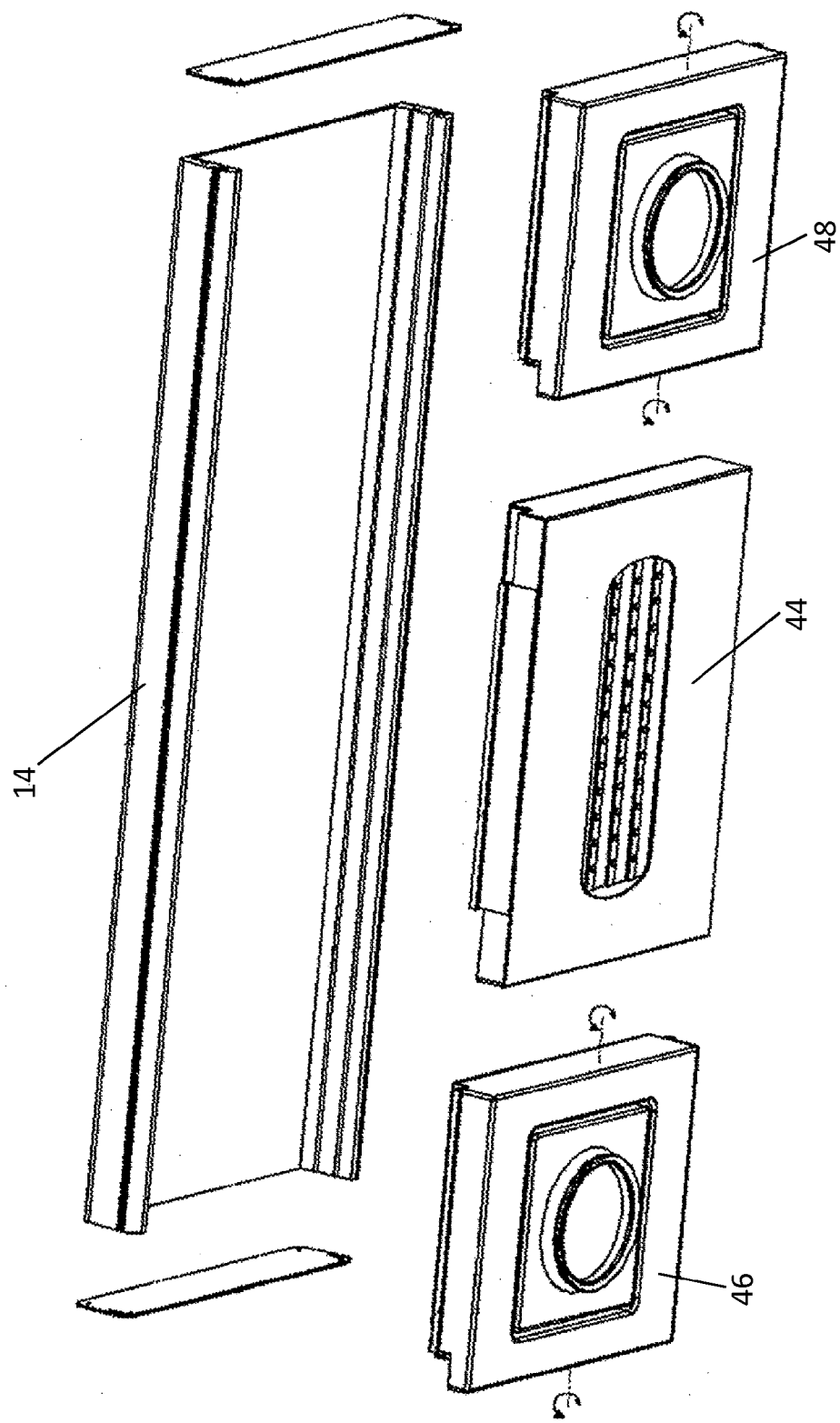
FIG. 6 is an exploded view of an adjustable aquarium lighting unit.

Turning to FIG. 3, a cylindrical aquarium again includes ornamental features 18 and a downwardly projecting light source (which may correspond to the light source described in relation to FIG. 4 or FIG. 6) mounted in a lid. In addition, an upper edge of the cylindrical aquarium includes a mountable track 32 from which a vertical light stack 34 is suspended. More particularly, a drive unit (such as a wheel—not shown) engages into the track, with the drive unit coupled to a motor that, under processor control, causes the vertical light stack 34 to follow the path of the track and thus circumscribe the cylindrical aquarium over a pre-set or selected period of time. The amount of movement of the vertical light stack 34 does not need to follow a 360° rotation but, if desired, might travel repeatedly through a smaller arc. In this way, with the light generally projecting towards a central vertical axis of the cylindrical aquarium there is an automated variation in the angle of incidence of the light falling upon the ornamental features 18, with different surfaces and facets of the ornamental features 18 attracting illumination and shadow at different points during the circumscribing motion of the vertical light source around the mountable track 32.

FIG. 4 shows an aquarium lighting system 40 assembled from three independent but inter-connectable light sources that each, potentially, offer automated control of light projection to allow each light source to provide time-varying impinging light inclination angles.

A central lid-mounted light source 42 contains a central light source 44 and two outboard light sources 46, 48. At least one of these light sources can be tilted or panned, although it is typical that the outboard light sources provides the tilting and panning capabilities for the aquarium lighting system 40. In FIG. 4, the light sources are each shown to be made from arrays of LEDs, with individual LEDs within the array or columns of LEDs within the array independently controllable from the perspective of power and angle of inclination of the principal axis of each LED. In other words, the LEDs can be manually adjusted to setup different light paths projecting outwardly along their principal axes. Additionally or alternatively, one or more of the central lid-mounted light source 42 and the two outboard light sources 44, 46 can have their respective arrays tilted or panned by servomotors responsive to microprocessor control. Therefore, not only can the initial illumination be set by physically aligning the various LEDs, but motorized control can further change the angles of inclination or angle of incidence over time.

The central lid-mounted light source 42 may furthermore be used in combination with the horizontal light bar 20 (as described in relation to FIG. 2) and the vertical light stack 34 (as described in relation to FIG. 3).

It is contemplated that individual light elements 50-60 in the horizontal light bar 20 and vertical light stack 34 can be controlled from the perspectives of both output power and its angular position relative to a nominal initial orientation within the respective light bar or light stack.

The main function of the light bar 20 and light stack 34 is to provide supplementary light to areas that either face directly towards the outside walls of the aquarium or which are beneath an overhang. Due to the normal application of ornamental aquarium features 18, the central high-mounted downward pointing lamp that is fixed in the lid of the aquarium provides little or no light to such areas; this contrasts with a natural environment where there is a shift in the light source and changing refraction effects in the water brought about by a change in the inclination and declination of the sun with time of day and year.

Obviously, these light bars and light stacks present an obstacle to a person viewing the aquarium, so it is preferred that the operation of the light bars and light stacks are timed with or triggered by a timeout of a motion sensor. A microcontroller based timer permits a user to set times to activate these light bars when, for example, the owner is out of the house or asleep. At other times, the light bars are stored in a position that limits their visibility, e.g. at a position close to or above the waterline in the aquarium.

In totality, the aquarium lighting system of FIG. 4 can therefore provide an almost infinitely adjustable light control pattern since the independent light sources are each controllable from the perspective of power and angular position or plane, with this meaning that any ornamental features located within an aquarium can be subjected to varying light illumination effects over time. A user is therefore able to manually plan an initial illumination of ornamental features, by adjusting the individual lamps or larger light sources as they desire, where after microprocessor controlled motorized operation can cycle away from this initial setup position and periodically returned to the initial setup position so as to alter instantaneous incident light power density with time.

Figure 5:
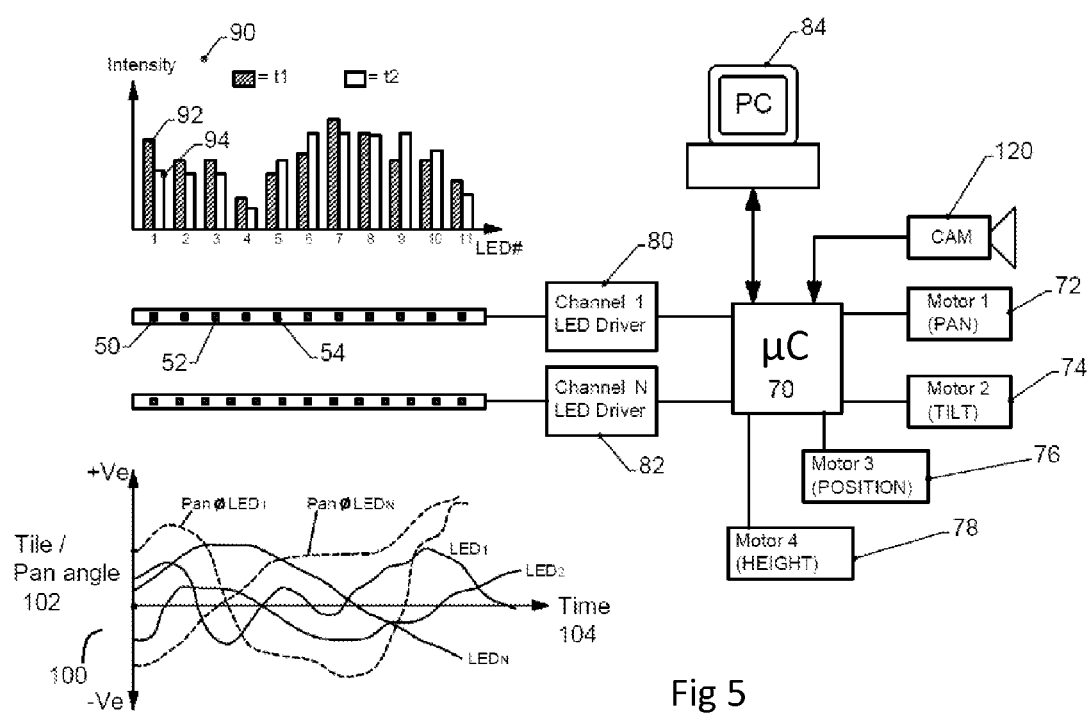
FIG. 5 is a schematic drawing of an aquarium light control system of an aspect of the present invention.

In terms of FIG. 5, a schematic diagram shows how an operating system for the aquarium lighting system of FIG. 4 may be configured. The precise system architecture can, of course, be varied since the schematic diagram illustrates the principal functional blocks rather than a manifestly precise circuit diagram evident to the skilled addressee. The system is based around a microcontroller 70 that is mounted inboard in the aquarium lighting system of FIG. 4. The microcontroller is operationally responsible for control of at least one (and typically a multiplicity) of servo-motors 72-78 that are associated with individual light source elements, such as individual lamps and is arrays of lamp fittings. One or more servo-motors may be associated with each of the lamps or arrays of lamps so as to provide different motorized control of those lamps, e.g. pan and/or tilt and/or height and/or mounting unit location (as in the case the vertical stack 34 on track 32). From the perspective of light output power and therefore brightness from each of the individual lamps or the array of lamps, the microcontroller 70 is coupled to a driver circuit (such as channel 1 LED driver 80). The microcontroller 70 may, in fact, be coupled to several driver circuits responsible for controlling individual lighting elements 50-60 or an overall output power from the lighting unit. Consequently, FIG. 5 shows (for reasons of clarity) only two LED drivers, although there may be N (where N is a positive integer) drivers in reality.

As indicated, the microcontroller 70 may, through the appropriate driver, provide individual power control to each of a multiplicity of light source elements mounted within a unit. In this way, the intensity of light and angular incidence of light (relative to a nominal plane) from the unit may vary from one end of unit to the other. Variation is entirely at the control of the user, with programming control exercised through a user interface of the microcontroller to an external computer 84 or the like. For example, the system may employ Pulse Width Modulation (PWM) or simple voltage control to adjust the brightness of each light source according to predefined or programmed schedule.

Returning to FIG. 5, a light unit may be made up of a linear array of LEDs (or the like), such as a string of, say, eleven independently illuminable LEDs of unitary color or a plurality of colors. The LEDs could be multi-color LEDs or a single narrowband color, such as blue or a broadband white. As shown in the accompanying graph 90, light intensity/power output of each LED may vary with time; this is illustrated by the differing heights of the bars 92, 94 for each LED/light source. Similarly, the microcontroller can employ motor control that, from an initial start point, follows a particular programmed regime. In this respect, the second graph 100 plots angle of tilt 102 (although this could equally be a plot of angle of pan or relative height or arc rotation of the stack 34 on its track) against time 104 for each of a multiplicity of individual light source or light units (i.e. time varying-plots for power, e.g. $LED_1$, or relative angular inclination, e.g. $Pan\phi LED_N$).

The microcontroller 70 may, furthermore, be coupled to a camera system 120 that includes a detector arranged to record relative areas of light and darkness within its field of view or panned field of view (should the camera be motorized). The function of the camera system 120 is described later.

Figure 7:
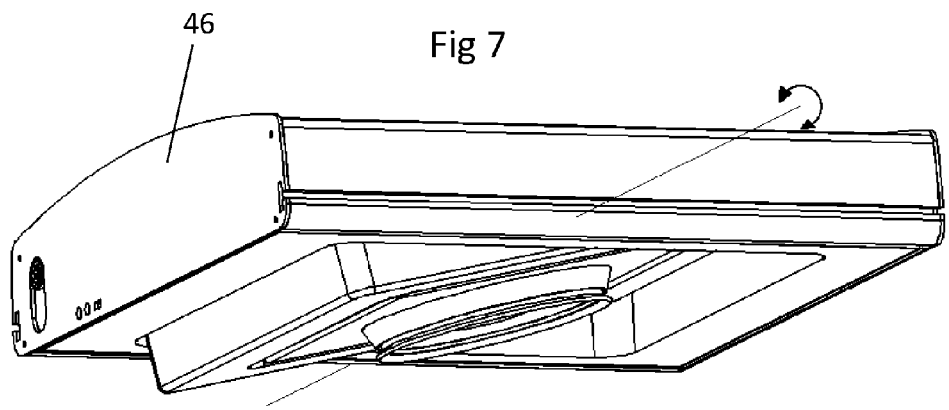
FIGS. 7 and 8 show tilt and pan adjustments of side light sources of FIG. 6.
Figure 8:
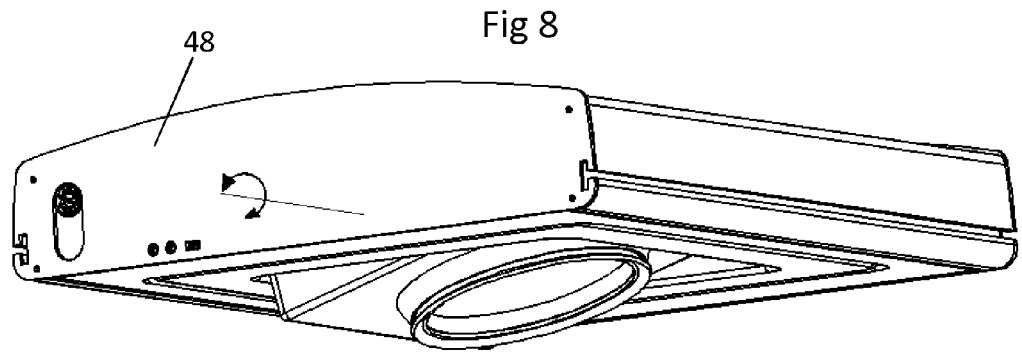

The embodiments of the present invention therefore commonly provide a mechanism for regulating and controlling incident illumination through one or both of a motorized system that adjust orientation of lamp arrays or light sources in the system and/or through power control of lamp arrays or light sources. As such, the microcontroller 84 operates to increase or decrease the light intensity at a particular point or points within the aquarium. Tilt and pan of a solitary light source (such as the outboard light sources 46, 48) are respectively shown in FIGS. 7 and 8. The solitary light source may therefore be mounted on a ball-and-socket like connector and/or on crossing guidewires that permit the light source to be moved in multiple degree of freedom, i.e. east to west and/or angle of incidence through pan and tilt functions.

Figure 9A:
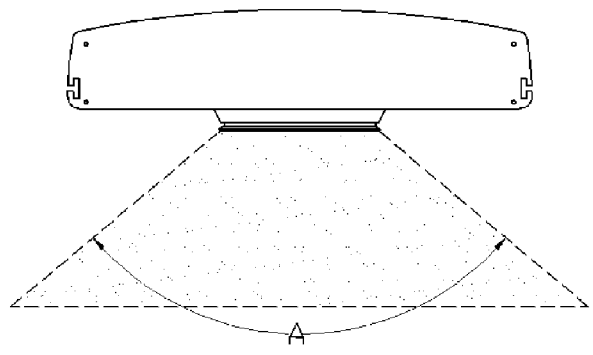
FIGS. 9a and 9b show a focus ring adjustment for the adjustable aquarium lighting unit of FIG. 6.
Figure 9B:
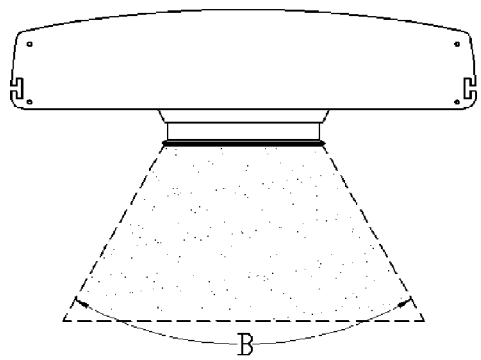

In addition to the controlling of tilt or pan or power, an alternative or complementary arrangement permits an area of illumination to be changed through the use of a lens system, such as convex lens, and a mechanical or motor-controlled change in the lens' focal length. The lens can, in fact, be adjusted manually and/or under motor control. Referring briefly to FIGS. 9a and 9b, a microcontroller can be arranged to actuate a servo motor that drives the lens into or out of its housing, thereby dispersing (FIG. 9a) or concentrating (FIG. 9b) the area of illumination. From an implementation perspective, a snoot or lens iris (or the like) can be mechanized to control the direction and/or radius of a light beam projected from a light source. Consequently, this feature allows the user to increase or decrease the beam angle into a spot or a flood beam. For example, if a high intensity is required at a deeper level of the aquarium, the snoot is controllably adjusted to be a spot so that most of the light will be narrowed into a smaller area. On the other hand, if the user determines that particular features in the aquarium do not require such a high intensity but rather warrant a larger illumination area at a lower power light, the snoot can be controllably adjusted to produce greater dispersion and thus to cover a larger area.

Increase or decrease in light intensity for particular a spot or area can thus be achieved with the combination of the pan/tilt motion that affects overall beam angle from the light source(s), with this optionally combined with an angle adjustable convex lens or snoot. Height adjustment or rotational position of, respectively, any horizontal light bar 20 or vertical light stack 34 may also play its part in affecting a change in light intensity at a spot or area in the aquarium. However, the use of light bars and light stacks (on one or more of the front, rear and side surfaces) and the lens/ring sub-system are generally considered as optional and thus subordinate in stature to the automated pan and tilt features of FIGS. 7 and 8. In this respect, FIG. 6 shows an exploded view of a motorized aquarium lighting system encompassing the fundamental aspects of the present invention. If necessary, the lid of the lighting system of FIG. 6 can include cooling fans to dissipate heat produced, for example, by the lighting sources and associated motors.

The embodiment of FIG. 6 (which may also be realized in a housing shape that is not rectangular) can be employed in large and small aquariums alike. With a single module system, the light source is directly placed over the center of the aquarium. The light source is then tilted from one end to the other reproducing the effect of the real sun when it moves from east to west. This means that "noon" time, the light source is directly over the center and provides a maximum amount of light to center and upper layer (typically water) in an aquarium. As the sun moves from the east, the light will gradually increase the intensity from either the "off" mode or the "moon light" mode. After the light source has passed the center point (noon time), the light will gradually dim down to either the "off" mode or the "moon light" mode. During a complete "off" mode or the "moon light" mode, the light source will move back to either the center or to the "east" side depending on the user's preference/setting. When the cycle starts, the light will move to the "east" side to restart a new cycle.

In the natural environment, the sun will move relative to a specific location and this allows the sunrays to shine into crevices or under the "overhang" to enable the organisms/creature located under the "overhang" to receive the required amount of light that is needed to stay alive and promote growth. With the embodiments of the present invention, the maneuverability of the effective position of the light source means that the highest intensity is controlled such that it is insufficient to induce localized bleaching or overheating.

System Set-Up

In terms of the microcontroller control and the set-up of the lighting system, a user may make direct use of a GUI in a PC or otherwise program the microcontroller (of FIG. 5) to define time points. For each time point, the user defines light intensity of each color channel (i.e. white, blue, royal blue, red, green and so on) and incidence angle (or location) of each movable light sources. This can be achieved by entering a learn mode in which the user initially manually adjust the positions of one or more light sources and the system is then tasked to record a snap-shot of that particular preferred set-up, i.e. the position and power levels of the lamps are monitored and recorded. The user then defines the transition effect between time points, i.e. linear or curve (Bezier curve). For a linear mode, the microcontroller operates increase/decrease light intensity gradually from "time point 1" to "time point 2" to reflect a natural variation of sunlight during a day of a particular season.

The microcontroller therefore has access to and can address a memory storage location, typically EEPROM, which memory location stores program instructions, including for example differing light properties experience season-by-season.

Besides recording a snap shot of user-preferred settings (including, if appropriate, those of the light bar 20 or light stack 34), the program may also impose random changes in brightness to individual light sources controlled by a particular LED driver or the like. In this way, the system imitates cloud movement across the sky by casting slow moving shadows on the ornamental landscape without the user having to provide finer detail. Similarly, the preselected illumination levels set by the user can be attenuated by stored (and optionally updateable) program coding that aligns with moon phase cycles and seasonal variations for declination or inclination of the sun.

Provision is made for the user to advance the current setting through contiguous time points, with this provision implemented by a direct interface that would be apparent to the skilled addressee.

The microcontroller and its associated storage may therefore record one or more of the following: i) real time; ii) moon cycle; iii) time point settings; iv) fan start temperature for initiating cooling; v) color channel values for all time points; vi) incident angle (or height or angular position) of each light source or spot for all time points; vii) weather mode preferences, e.g. simulated cloud cover; viii) sunrise/sunset durations; ix) maximum simulated brightness of moonlight; x) smoothing factor allowing transitions between adjacent each time points pair, e.g. 8:00 am to 11:30 am might be programmed as a linear transition whereas the transition between 2:00 pm to 5:00 pm is a complex or curved transition function.

Camera System

Returning to FIG. 5 and the provision of the camera system that is mounted in the lid and, in cooperation with the microcontroller, is tasked to capture and then assemble a 3D model of illumination patterns cast on fixed ornamental features 18, such as corals, in the aquarium. Processing of the raw captured data may be undertaken by a higher-powered external processor, such as available at the connected PC 84. Techniques for assessing light fields are known to the skilled addressee and can be based, for example, on inserting a microloans array between the sensor and main lens, thereby creating a plenoptic or fight field camera. In generality, each microlens measures not just the total amount of light deposited at that location, but how much light arrives along each ray. Other techniques may be employed, as will be understood.

In addition, direct sensors may be placed onto areas in the tank to monitor and communicate light levels falling incident on those sensors. The use of such tank sensors provides a finer degree of light source control and adaption.

By using logic, the system estimates the light intensity of each position. Based on the information, the system may generate a recommended lighting plan based on observed intensities and, potentially, may also adapt flow rates through a microcontroller-controlled pump system. Once user approves and uploads the program setting into light fixture(s) by monitoring the system over time, the light control model adapts to reflect changes induced in growth by particular applied light settings. This monitoring function therefore allows a user to exercise additional control over environmental development and particularly slow marine growth.

The controlled automated movement of the light firstly provides an ability potentially to illuminate every corner and crevice within the aquarium. Movement also allows capture of a full tank 3D image. Particularly, by moving the camera angularly for back and forth) a set of images can be captured and stored. Using these images (which may not be a sharp focus) it is possible to reconstruct the light field in the aquarium. For example, the light field can be reconstructed using existing algorithms that using in X-ray computed tomography and light field cameras. The light field can then be used to render 3D scenes of whole tank.

Also, the system permits a determination of flow rates at various points within the aquarium. In this regard, to measure the flow rate of each point a light field camera is positioned and arranged to capture multi-still light field pictures of moving objects, such as the leaves on a plant. By comparing the object positions, it is possible to calculate the precise flow rate at the analyzed point.

Traditionally, such flow rate and 3D scene information required costly laboratory-level equipment, but with the image light field camera and positionable light sources (of the preferred embodiment) it is possible to prepare the rendering and assess flow rates at a fraction of the previous costs.

It will be understood that unless features in the particular preferred embodiments are expressly identified as incompatible with one another or the surrounding context implies that they are mutually exclusive and not readily combinable in a complementary and/or supportive sense, the totality of this disclosure contemplates and envisions that specific features of those complementary embodiments can be selectively combined to provide one or more comprehensive, but slightly different, technical solutions.

It will, of course, be appreciated that the above description has been given by way of example only and that modifications in details may be made within the scope of the present invention. For example, while a preferred embodiment makes use of lower power consuming LEDs, it is contemplated that other light sources may be used, including but not limited to) fluorescent, incandescent, metal halide technology or any combination thereof. Each lighting unit may be a planar, point or array of individual light sources. Each lighting unit may, if necessary or desirable, comprise a lens, interchangeable filters or perforated screens adapted to modify the illumination provided.

Different colored LEDs and individually controlled color channels allows the user to fine tune the color temperature in the aquarium, with this accentuating observed colors from, especially, aquatic life supported in the aquarium.

The invention claimed is:

1. An aquarium lighting system coupled to an aquarium containing at least one of corals, living plants and algae, the aquarium lighting system comprising:
    a frame mounted on the aquarium;
    at least one light source within a housing mounted on the frame, the light source projecting, in use, a controllable light pattern;
    an electrical drive unit coupled to the at least one light source, the electrical drive unit configured to moderate projection of the controllable light pattern by at least controlling a change in orientation of the at least one light source in its housing through selective variation of at least one of pan and tilt; and
    a programmable controller coupled to at least one electrical drive unit, the programmable controller configured to regulate operation of the aquarium lighting system over the course of a day by controlling the at least one electrical drive unit to alter and change the controllable light pattern into the aquarium projected by said at least one light source over the course of the day such that light power intensity in the incident projected light pattern is controlled to influence a rate of growth of the at least one of the corals, the living plants and the algae;
    and wherein the system comprises a plurality of individually controllable light sources each coupled to the frame, each of said plurality of individually controllable light source coupled to an associated electrical drive unit operationally responsive to the programmable controller, the programmable controller configured to orchestrate individual movement of the plurality of individually controllable light sources to after over time a composite projected light pattern produced by superposition of individual controllable light patterns projected from each of said plurality of individually controllable light sources.

2. The aquarium lighting system of claim 1, wherein the programmable controller is further configured to control light intensity of said at least one light source.

3. The aquarium lighting system of claim 1, further comprising:
    memory addressable by the programmable controller, the memory storing at least one user-defined sequence of light patterns achieved through managed movement control of the at least one electrical drive unit.

4. The aquarium lighting system of claim 1, wherein the at least one light source includes a lens having a controllable focus.

5. The aquarium lighting system of claim 1, wherein the at least one light source includes a lens having a controllable focus.

6. The aquarium lighting system of claim 1, wherein the plurality of light sources output different optical wavelengths.

7. The aquarium lighting system of claim 1, wherein the programmable controller coordinates movement of said at least one light source or characteristics of the controllable light pattern to mimic at least one effect selected from the group of:
    i) moon cycle;
    ii) solar inclination and declination;
    iii) sunrise
    iv) sunset; and
    v) atmospheric weather effects.

8. The aquarium lighting system of claim 7, wherein the programmable controller is configured to regularly change the controllable light pattern to mitigate localised heating effects that would otherwise arise from a fixed pattern.

9. The aquarium lighting system of claim 2, wherein the programmable controller is configured to regularly change the controllable light pattern to mitigate localised heating effects that would otherwise arise from a fixed pattern.

10. The aquarium lighting system of claim 8, wherein the change in controllable light patterns is a continuous change in light direction of the projected light pattern, light intensity of the projected light pattern or light direction and light intensity of the projected light pattern.

11. An aquarium lighting system comprising:

a frame;

at least one light source within a housing mounted on the frame, the light source protecting, in use, a controllable light pattern;

an electrical drive unit coupled to the at least one light source, the electrical drive unit configured to moderate projection of the controllable light pattern by at least controlling a change in orientation of the at least one light source in its housing through selective variation of at least one of pan and tilt and preferably both pan and tilt; and a programmable controller coupled to at least one electrical drive unit, the programmable controller configured to regulate operation of the aquarium lighting system by controlling the at least one electrical drive unit to alter and change over time the controllable light pattern projected by the at least one light source; and a light field camera providing image data to the programmable controller, wherein the programmable controller is further configured to process the image data to determine incident light levels at selected points within the tank.

12. An aquarium lighting system comprising:

a frame;

at least one light source within a housing mounted on the frame, the light source projecting, in use, a controllable light pattern;

an electrical drive unit coupled to the at least one light source, the electrical drive unit configured to moderate projection of the controllable light pattern by at least controlling a change in orientation of the at least one light source in its housing through selective variation of at least one of pan and tilt and preferably both pan and tilt; and a programmable controller coupled to at least one electrical drive unit, the programmable controller configured to regulate operation of the aquarium lighting system by controlling the at least one electrical drive unit to alter and change over time the controllable light pattern projected by the at least one light source; and at least one sensor within the tank, the sensor coupled to the programmable controller and configured to monitor light levels falling incident on the sensor and to communicate said light levels to the programmable controller, wherein the programmable controller is configured to regulate operation of the aquarium lighting system by controlling the at least one electrical drive unit to alter and change the controllable light pattern in response to the monitored light levels.

* * * * *